United States Patent [19]

Dawson

[11] 4,081,979

[45] Apr. 4, 1978

[54] LOCKING FASTENER ASSEMBLY

[75] Inventor: Raymond B. Dawson, Berkeley Heights, N.J.

[73] Assignee: Super Stud Products, Inc., Berkeley Heights, N.J.

[21] Appl. No.: 744,629

[22] Filed: Nov. 24, 1976

[51] Int. Cl.² .......................................... E05B 73/00
[52] U.S. Cl. .......................................... 70/58; 70/231
[58] Field of Search ................................ 70/57–58, 70/229, 230, 231, 232, 259; 85/35, 45, 42; 248/203

[56] References Cited

U.S. PATENT DOCUMENTS

| | | | |
|---|---|---|---|
| 1,903,121 | 3/1933 | Lussier | 85/42 |
| 2,286,950 | 6/1942 | Breedlove | 70/229 |
| 2,978,896 | 4/1961 | Saccone | 70/231 |
| 3,492,841 | 2/1970 | Ipri | 70/231 |
| 3,540,245 | 11/1970 | Pope | 70/231 |
| 3,563,070 | 2/1971 | Earl | 70/58 |

FOREIGN PATENT DOCUMENTS 881,129   6/1953   Germany ................ 85/45

Primary Examiner—Robert L. Wolfe
Attorney, Agent, or Firm—Stefan J. Klauber

[57] ABSTRACT

A locking fastener assembly is disclosed for securing electronic equipment or the like to a mounting bracket. The device includes a stud assembly comprising a threaded shank portion for passing through an opening in the bracket, and being threadingly received in an opening at the equipment. An enlarged head adjoins the shank and has a plurality of openings for receiving engaging pins from a cooperating tool. The spatial pattern of the openings (e.g. a spiral) define a plurality of different spacings between pairs of the openings. An annular freely rotatable collar surrounds the head and projects to at least cover the rim of the head, to prevent grasping of such head by a tool. A tool member is provided having a face opposable to the head, the face including a plurality of openings in a pattern corresponding to that on the head. A pair of engaging pins are secured within a pair of openings in the tool member, whereby by overlying the pattern on the tool member with the corresponding pattern on the head, the pair of pins may engage with corresponding openings in the head to permit application of torque for tightening and loosening the stud assembly. The operator may set or encode the fastener assembly by inserting the engaging pins at a selected pair of the openings in the tool member, and closing all openings on the head with a filler material except for the pair of openings alignable with the selected pair at the tool member. Accordingly only a tool member similarly set or encoded will be operable to engage with the head portion.

11 Claims, 8 Drawing Figures

LOCKING FASTENER ASSEMBLY

BACKGROUND OF THE INVENTION

This invention relates generally to fastening devices and assemblies, and more specifically relates to an assembly of this type which is useful in deterring theft or unauthorized removal of affixed electronic equipment or the like.

In recent years enormous interest has developed in various electronic accessories, which are installable at a vehicle or other location by a purchaser of such equipment. Reference is made here particularly to the explosive interest which has developed in the field of CB communications equipment. Devices of this type, as well as other electronic accessories, such as tape players or so forth, are commonly purchased by the user subsequent to purchase of the automobile or other vehicle in which such equipment is to be installed. In a typical procedure, for example, a bracket, such as a mounting yoke or the like, is secured by relatively permanent means within the vehicle as, for example, by mounting same under a dashboard. The electronic equipment per se, such as the CB transceiver, is then secured to the bracket or the like, by means of relatively conventional easily installable and removable fasteners.

In a typical prior art arrangement, for example, the said transceiver is emplaced within a yoke-like bracket by means of threaded fasteners which pass through openings in the yoke and are threadingly received into openings at the sides of the CB unit. These fasteners are often provided with enlarged heads, which can be manipulated manually or by a tool; i. e. the fasteners function in the manner of wing bolts.

As is now all too familiar, however, to users of equipment of the aforementioned type, as well as to law enforcement officials, the theft rate with respect to such equipment has reached epidemic proportions. Consideration of the theft pattern indicates that a major reason for same is the relative ease with which the equipment may be detached from the vehicle. In most instances investigation reveals that the thief simply acquires the equipment by removing the aforementioned fastening means, which is unfortunately a very simple and fast operation.

The problem outlined in the foregoing paragraph is not, of course, unique to the electronic equipment field. In numerous other environments, equipment including office machines such as typewriters or the like, are stolen with ease—in part because of absence of fastening devices tending to deter such theft. While numerous devices have been described over the years, which in one manner or another effect fastening so as to discourage removal of the fasteners (and thus of the equipment), by and large these devices have not been particularly effective; and none are deemed especially suitable for use in the environment especially considered by the present invention.

In accordance with the foregoing, it may be regarded as an object of the present invention, to provide a fastener assembly which is especially adapted for securing electronic equipment or the like to a vehicle-attached mounting bracket, which assembly is readily installed and removed by an authorized individual, but which can be removed only with great difficulty by thieves or other unauthorized personnel.

It is a further object of the present invention to provide a device of the aforementioned character, which includes features enabling the user to encode or set the stud assembly and the tool member used therewith, so as to key these elements to one another, thereby preventing use of similar tool members with the stud assembly if not specifically keyed thereto.

SUMMARY OF THE INVENTION

Now in accordance with the present invention, the foregoing objects, and others as will become apparent in the course of the ensuing specification, are achieved in a locking fastener assembly, which includes a stud assembly comprising a threaded shank portion and an enlarged head portion adjoining the shank portion, a collar surrounding the head portion and freely rotatable thereabouts, and a tool member engageable with openings provided in the aforementioned head portion. The threaded shank portion, in use, passes through an opening in the bracket or similar plate affixed to the vehicle, and is threadingly received in an opening at the equipment to be secured. The enlarged head portion is provided with a plurality of openings for receiving engaging pins from the cooperating tool member. The spatial arrangement of the openings on the head portion is such as to define a plurality of different spacings between pairs of the openings—e.g. the said openings may be arranged along a spiral, with the distance between any successive two openings being distinct for the pattern. The annular collar is freely rotatable about the head and projects to at least cover the rim of said head, thereby preventing grasping of the head by a wrench, pliers or similar tool.

The tool member of the fastener assembly has a face opposable to the aforementioned head portion, which face includes a plurality of openings arranged in a pattern corresponding to that on the head portion. A pair of engaging pins are secured within a pair of the openings in the tool member, whereby by overlying the pattern on the tool member with the corresponding pattern on the head portion, the pair of pins may engage with the corresponding openings in the head to permit application of torque for tightening and loosening the stud assembly.

The operator may set or encode the fastener assembly by inserting the engaging pins at a selected pair of the openings in the tool member, and thereupon close all openings on the head with a filler material—except for the pair of openings alignable with the selected pair at the tool. Accordingly, only a tool member similarly set or encoded will be operable to engage with the head portion.

BRIEF DESCRIPTION OF DRAWINGS

The invention is diagrammatically illustrated, by way of example, in the drawings appended hereto, in which.

DESCRIPTION OF PREFERRED EMBODIMENT

Figure 1:
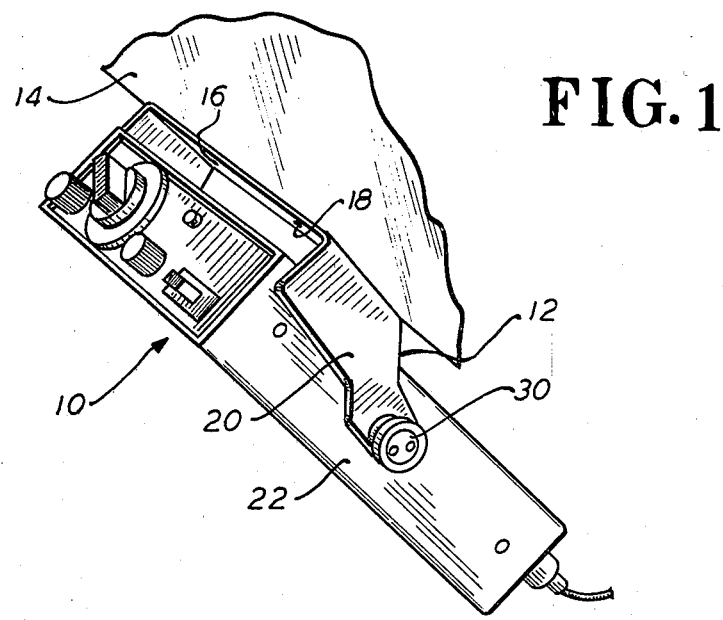
FIG. 1 is a perspective view, illustrating the stud assembly portion of the present invention in use securing a representative piece of electronic equipment.

In FIG. 1 herein a perspective view appears illustrating a typical application to which the present fastener may be placed. There is thus shown therein, a conventional CB transceiver 10, which per se does not constitute part of the present invention except to set forth the area of application of the invention. Transceiver 10 as is typical and representative of the art, is secured within a vehicle or similar environment by means of a mounting bracket 12, which in the present instance takes the form of a yoke. Bracket 12 is secured to a permanent portion of the vehicle as, for example, the underside 14 of a dashboard by means of relatively permanent fasteners 16 and 18. In a typical installation fasteners 16 and 18 are relatively inaccessible for removal by a vandal or thief.

Figure 2:
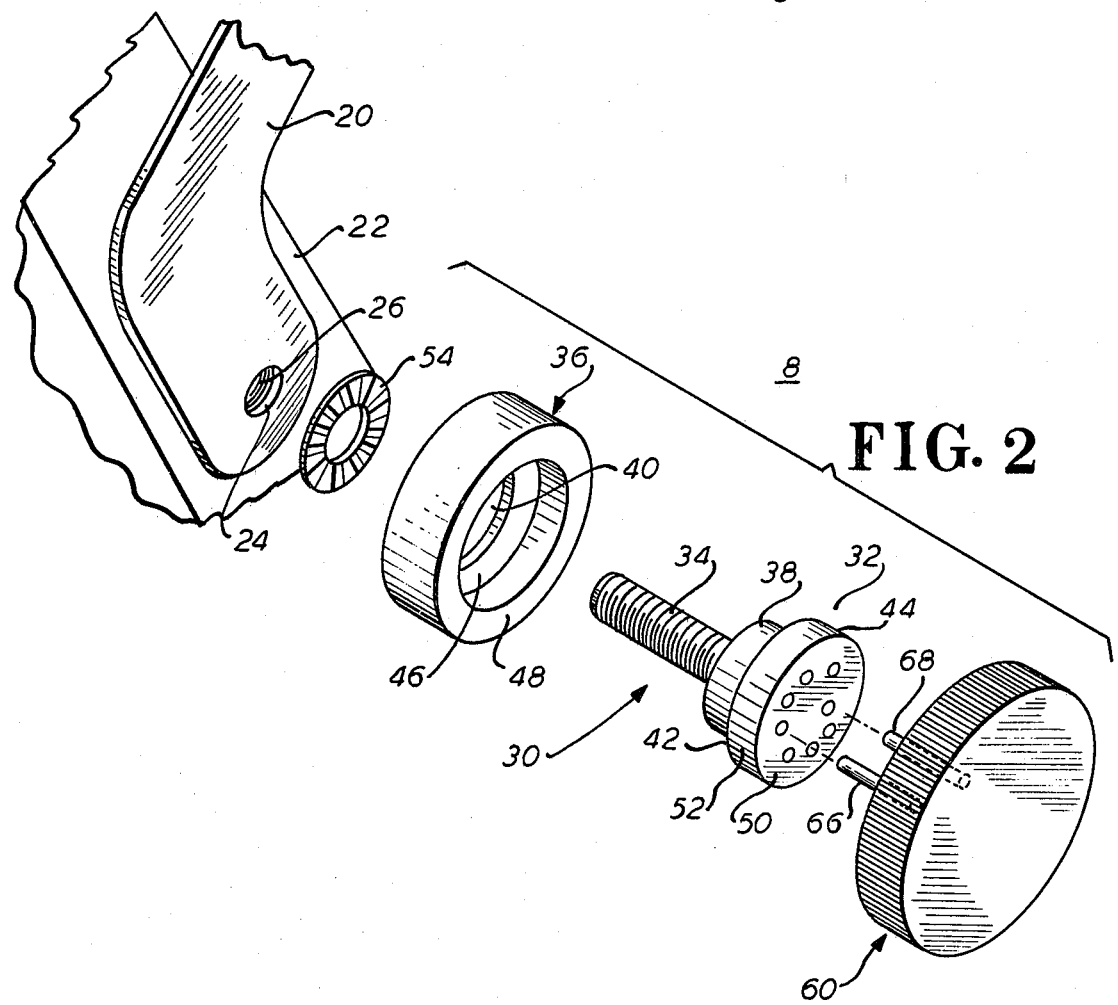
FIG. 2 is an exploded perspective view of a preferred form of locking fastener assembly in accordance with the invention.

By referring particularly to the exploded view of FIG. 2, it will be seen that the arms 20 of bracket 12 lie adjacent the side 22 of transceiver 10. In prior art practice a simple wing-type bolt or similar conventional fastener passes through the opening 24 in arm 20, and then is threadingly received in an opening 26 provided at side 22 of the transceiver. In practice a plurality of receiving openings 26 may be present in such electronic unit, and thus a plurality of such wing bolts or the like may be used—although in the most common case the number of such openings and corresponding wing bolts is limited to about two (one on each side of the electronic unit).

It should, of course, be understood in connection with the description thus far provided, that the present invention is not limited to use with any particular type of electronic equipment. Thus transceiver 10 is merely representative of a large group of devices of this type widely used as accessories in vehicles, including e. g. tape players, recorders, and similar instruments well known to those familiar with the art. Similarly it is re-emphasized that while the present invention is especially useful in securing accessories or the like within vehicles, the invention finds application in numerous other fields—e.g. in securing typewriters or other office equipment to desks, tables or the like.

In accordance with the present invention the conventional wing bolt as heretofore described, is replaced by a stud assembly 30—which includes a head portion 32 and shank portion 34. Shank portion 34 passes through opening 24 in bracket 12 and is engaged in the threaded opening 26 within transceiver 10. When thus threadingly received head portion 32 is surrounded by a collar 36, with the reduced part 38 of the head portion passing through the opening 40 in collar 36 so that the lower surface 42 of enlarged head disc 44 rests on the recessed rim 46 within collar 36. The collar 36 constitutes a tough and resistant metal such as a machined stainless steel or the like, and is freely rotatable about head portion 32. Since further the upper face 48 of collar 36 extends, when assembled, to at least or beyond the axial coordinate of face 50 of head portion 32, it will be clear that the rim 52 of such head portion cannot be grasped by a tool such as a wrench or pliers, which can at best grasp the collar 36 and rotate same about the said head portion. A conventional locking washer 54 may conveniently be provided between mounting bracket 12 and stud assembly 30 to assist in tightening the stud assembly in place.

Figure 7:
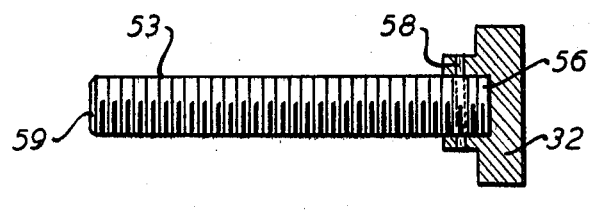
FIG. 7 is a longitudinal cross-sectional view through an alternate embodiment of a stud assembly utilizable with the invention.
Figure 8:
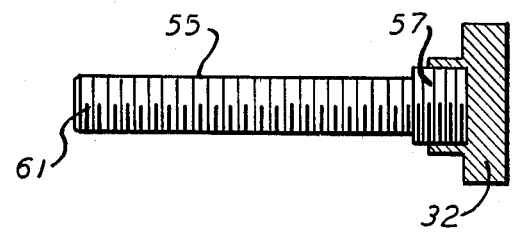
FIG. 8 is a longitudinal cross-sectional view through a yet further type of stud assembly utilizable with the invention.

The stud assembly 30 can be formed as a unit by conventional machining or other operations. It is also within the province of the invention however, for shank portion 34 to be separate from head portion 32. Embodiments of this latter type structure appear in FIGS. 7 and 8. In both of these instances the shank portion 53 or 55 is threaded at both the distal ends 59 and 61 thereof, i. e. that received into opening 26; and also at the ends 56, 57 which are to be received within head portion 32. The advantage of the "separable" arrangements of FIGS. 7 and 8, is that one may provide in a single kit, several shank portions, the distal ends of which have different diameters enabling use thereof with differing equipment. Thus in FIG. 7 the shank portion 53 is seen to have a uniform diameter throughout, while in FIG. 8 the shank portion 55 has a diameter at its end 57 which is identical to end 56 of the shank portion 53 shown in FIG. 7; however, the diameter is thereupon reduced at the remaining portion 55 thereof. Hence it will be clear that the shank portion 53 or 55 of FIGS. 7 or 8 may be used with the same head portion 34, while the distal ends 56, 57 thereof differ in the two cases to enable accommodation to specific equipment.

A pin 58 may be passed through ends 56 or 57 (as shown in FIG. 7) and engage in head portion 32, to lock the shank portions against relative rotation with respect to head portion 32 during removal of stud assembly 30. Other techniques can be used to achieve the same result; e. g. an adhesive may be interposed between head portion 32 and shank portion 53 or 55, or an interference fit may be provided between the threaded shanks and head portions.

The fastener assembly 8 of the present invention is specifically adapted so that the stud assembly 30 thereof may be inserted and removed by the tool member 60. Referring more specifically to the top plan view of FIG. 3, it is seen that face 50 of head portion 32 is provided with a plurality of openings 62, which are arranged with respect to one another as to define a pattern generally designated at 64. Openings 62 are circular unthreaded cavities extending into disc 44, e.g. typically to a depth of about ⅛ inch, which cavities are adapted to receive engaging pins 66 and 68, which are associated with tool member 60.

Figure 3:
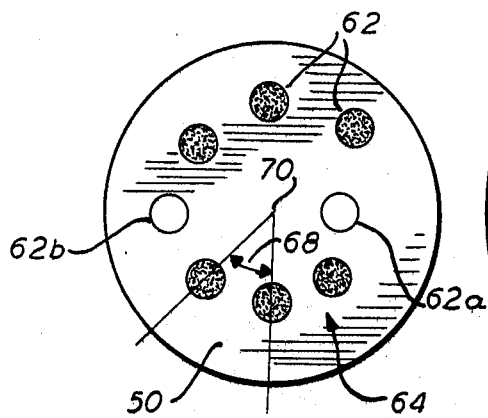
FIG. 3 is a top plan view of the head portion of the stud assembly shown in FIG. 2.

In the arrangement illustrated in FIG. 3 the openings 62 are seen to be arranged so that pattern 64 thereby defined, is in the form of a spiral. More specifically it will be observed that the angle 68 subtended at the center 70 of such spiral is approximately the same between any two adjacent openings 62 on the spiral. Since, however, the distance of any given opening on the spiral from center 70 is unique to that particular opening, it will be clear that the distance between any adjacent openings on the spiral is different from the distance between another pair of such adjacent openings on said spiral. Additionally, it can be shown that the various possible combinations of non-adjacent openings on the spiral provide further possibilities for differing spaces between selected pairs of openings. Thus the principle will be clear, pursuant to the invention that via pattern 64, a plurality of opening 62 is provided, enabling in turn a plurality of spacing relationships, depending upon the particular pair of openings selected for determining such distance. The significance of this construction will shortly be evident.

Figure 4:
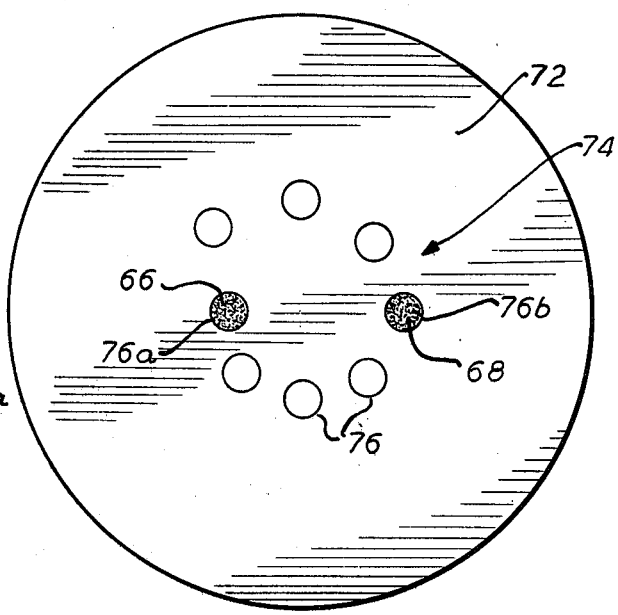
FIG. 4 is a plan view of the lower face of the tool member appearing in FIG. 2.

Referring nextly to FIG. 4, a plan view of tool member 60 is set forth. By consideration of the arrangement on the lower face 72 thereof, it will be seen that a pattern 74 of openings is provided, which is in substantially the mirror image of pattern 64 on face 50. In this particular instance the spiral proceeds outwardly in a counter clockwise direction, whereas in pattern 64 the spiral proceeds outwardly in a clockwise direction. The openings 76 defining pattern 74 are of the same type discussed in connection with face 50, i. e. they are mere unthreaded cylindrical cavities projecting into the body of tool member 60, typically a distance ⅛ inch, and which are therefore adapted to receive the aforementioned engaging pins 66 and 68.

With the aid of the foregoing it will be clear that the tool member 60 can be utilized for applying torque to tighten or loosen stud assembly 30, by inserting the engaging pins 66 and 68 within a pair of the openings 76 in tool member 60, and then bringing the said tool member in overlying relationship to face 50, so that the patterns 64 and 74 overlie. The said pair of pins 66 and 68 then are made to engage the corresponding opening pair at face 50, which then permits the user to tighten or loosen stud assembly 30.

The engaging pins 66 and 68 are simple stud members, typically of 1/16 inches diameter, and about ¼ inches long, and the openings 76 at face 72 of tool member 60 are preferably slightly smaller than those at face 50 in the stud assembly, so that pins 66 and 68 once emplaced by a user at the tool member, will be retained therein, but may be readily inserted and removed from stud assembly 30.

It will be evident from the foregoing that tool member 60, including its pattern 74 of openings 76, is only effective in engaging with the face 50 of stud assembly 30 when the respective patterns on face 50 and face 72 are properly overlying. Pursuant to a further aspect of the present invention, there is enabled a simple setting or encoding scheme, which renders it extremely difficult for an unauthorized individual, vandal, thief, of the like, to remove the stud assembly 30—even if such individual has at hand a tool of the type illustrated by member 60.

In particular, it will be appreciated that the user or purchaser of the present fastener assembly 8, is initially provided with the component parts separated from one another, and with the engaging pins 66 and 68 not yet emplaced within tool member 60. At this point, all openings 62 on face 50, and the corresponding but mirrored openings 76 on face 72 of tool member 60, are simple cavities or voids.

The purchaser now proceeds to emplace the engaging pins 66 and 68 in a selected pair of openings at face 72. Illustratively in FIG. 4 such pins are shown emplaced at openings 76a and 76b. The user now proceeds to fill with a suitable material, all of the openings 62 at face 50 of stud assembly 30, except for the pair of openings illustratively shown as 62a and 62b, which are intended to mate with the said emplaced pins 66 and 68. The FIG. 3 showing thus depicts the remainder of such openings 62 filled with appropriate material. Such material, e. g. may comprise a simple hardenable epoxy composition as, for example, the putty-like moldable products of this type available in strip form under the product name E-Pox-E Ribbon from Woodhill Chemical Co., Cleveland, Ohio 44128. A small strip of this material may be provided to the purchaser of the present assembly 8 with the assembly, or can obtained separately by him, and is manually applied to the non-utilized openings 60 to fill same, whereupon (after "setting" of the filler compositions) the openings 60 are no longer accessible by engaging pins.

It will be evident that the net result of the foregoing operation is that the user has now set or encoded the stud assembly 30 to render same engageable by a tool mender 60 with a pin pair positioned for engagement witqqthe stud assembly. Even in those instances where an individual has access to a tool member as at 60, such tool will not be operable to engage stud assembly 30, where the engaging pins 64 and 66 therein have been inserted at the other than the appropriate member pair of openings at face 72 of the tool member.

In a variation on the technique described, the user following insertion and tightening of stud assembly 30, may fill all openings 60 with the aforementioned hardenable filler material. By such approach the stud assembly becomes completely inaccessible to later removal (even by an encoded tool member 60) and the technique is therefore only used in those instances where the user desires a totally permanent installation.

Figure 5:
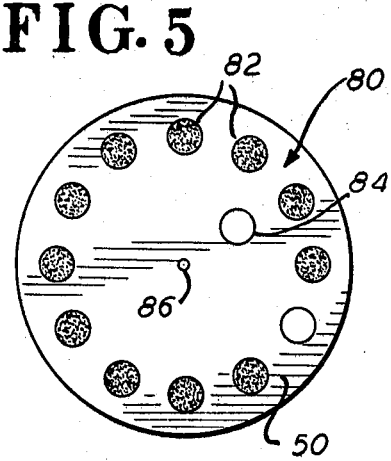
FIG. 5 is a top plan view of a head portion similar to that of FIG. 3, but illustrating a further pattern suitable for the openings present on such head portion.
Figure 6:
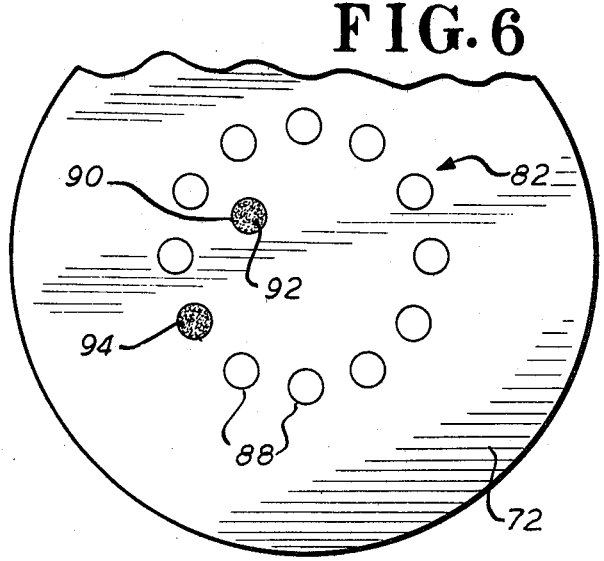
FIG. 6 is a bottom plan view, similar to FIG. 4, illustrating the pattern arrangement appropriate for the use with the head portion pattern in FIG. 5.

In FIGS. 5 and 6, views are shown corresponding to the FIGS. 3 and 4 depictions already discussed, but illustrating arrangements of a further pattern 80 and mirror pattern 82, for use respectively at face 50 of study assembly 30, and at face 72 of tool member 60. In this instance pattern 80 is defined in part by a series of openings 82, which form a circle, with the spacing between any two adjacent openings on the circle being the same. The pattern 80 includes a further opening 84, which is radially displaced from the geometrical center 86 of the circular pattern. The mirrored corresponding pattern 82 on tool member face 72, includes in pattern 82 a similar series of openings 88 arranged in a circle, and an off-center opening 90.

In the arrangement of FIG. 5, it will be evident that by combining opening 84 with any one of the openings 82 about the mentioned circle, 12 distinct combinations of different spacings are possible. In the arrangement illustrated the pin pair 92 and 94 is arranged so that one of the said pins, i.e. pin 92 is at the off-center opening 90 overlying opening 84 when tool member 60 is in use, and the alternative pin 94 is positioned in correspondence to the other selected opening to be utilized at face 50. In the preferred mode of use of the present invention, the purchaser or user once again will (after selection of the pair of openings in the pattern 80 to be used) fill all remaining openings 82 at face 50 with the filler composition aforementioned, e. g. typically an epoxy or other composition, which thereafter hardens to prevent access to the filled voids.

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly the invention is to be broadly construed, and limited only by the scope and spirit of the claims now appended hereto.

I claim:

1. A locking fastener assembly for securing electronic equipment or the like to a mounting bracket or the like, comprising in combination:
   a stud assembly comprising a threaded shank portion for passing through an opening in said mounting bracket and being threadingly receivable in an opening at said equipment, and an enlarged head portion at one end of said shank portion having a plurality of openings for receiving engaging pins therein from a cooperating tool, the spatial pattern of said openings defining a plurality of different spacings between selected pairs of said openings;
   an annular collar surrounding said head portion and projecting in a direction opposite said threaded shank to at least cover the rim of said head portion, said collar being freely rotatable about said head portion to prevent grasping thereof by a tool;
   a tool member having a face opposable to said collar and head portions, said face including a plurality of openings in a pattern mirroring said pattern on said head portion;
   at least a pair of engaging pins being provided within a pair of said openings in said tool member, whereby by overlying said pattern on said tool member with said mirroring pattern on said head portion, said pair of pins may engage with corresponding openings in said head to permit application of torque to tighten and loosen said stud assembly; all of said openings on said head except for the pair alignable with the said pins being closed with a filler material, whereby engagement with said tool member can only be effected when said pin pair is keyed with the alignable pair of openings on said head portion.

2. A locking assembly in accordance with claim 1, wherein the said patterns defined by said openings are spirals, successive of said openings along said spiral being spaced at successively equal angular intervals with respect to the center of said spiral.

3. A locking assembly in accordance with claim 1, wherein at least some of said openings are equally spaced about the circumference of a circle, and a further of said openings is within said circle and displaced from the center thereof, whereby said further opening in combination with one or another of said openings on said circle defines said plurality of differently spaced pairs.

4. A fastener assembly in accordance with claim 1, wherein said collar projects in said direction opposite said threaded shank beyond the plane of said head.

5. A fastener assembly in accordance with claim 1, further including lock washer means between said stud assembly and the engagement point with said bracket, for locking said assembly against rotation.

6. A device in accordance with claim 1, wherein said threaded shank portion is separable from said head portion and is threadingly received in said head portion.

7. A locking assembly in accordance with claim 6, wherein the end of said threaded shank portion distal from said head portion has a diameter differing from the portion threadingly receivable within said head portion.

8. In the method for securing electronic equipment or the like in a vehicle, said equipment being of the type including at least one threaded opening for normally receiving a securing bolt by passage of said bolt through a mounting means secured to the said vehicle and into said equipment opening; the improvement enabling ready securing of said equipment while discouraging unauthorized removal thereof, comprising the steps of:
   providing a stud assembly including a threaded shank portion for passing through said mounting means and being threadingly receivable at said opening at said equipment, and an enlarged head portion at the opposed end of said shank portion, said head portion having a plurality of openings for receiving engaging pins therein from a cooperating tool, the spatial pattern of said openings defining a plurality of different spacings between pairs of said openings; and an annular collar surrounding said head portion, said collar being freely rotatable about said head portion and projecting in a direction opposite said threaded shank to at least the end of said head portion, to thereby prevent grasping of said head portion by a tool;
   providing a tool member having a face opposable to said collar and head portions, said face including a plurality of openings in a pattern in mirror correspondence to said pattern on said head portion;
   preselecting a pair of said openings in said pattern on said head portion and filling the remainder of said openings in said head portion pattern to effectively close said remaining openings; and
   securing a pair of engaging pins in the openings on said tool member corresponding to the said selected pair on said head portion, whereby by overlying said pattern on said tool member with the corresponding pattern on said head portion, said pair of pins are engageable with said selected pair of openings in said head to permit application of torque to tighten and loosen said stud assembly, but whereby a similar tool member wherein said pins are not emplaced in correspondence to said selected pair cannot be engaged with said head portion.

9. An operator-set locking fastener assembly for securing electronic equipment or the like to a mounting surface or the like while discouraging unauthorized removal of said equipment, said assembly comprising in combination:
   a stud assembly comprising a threaded shank portion for passing through said surface and being threadingly received in an opening at said equipment, and an enlarged head portion adjoining said shank portion and having a plurality of openings for receiving engaging pins therein from a cooperating tool, the pattern of said openings defining a plurality of different spacings between selected pairs of said openings;
   an annular collar surrounding said head portion and covering at least the rim of said portion, said collar being rotatable about said head portion to prevent grasping at said portion by a tool;
   a tool member having a face opposable to said collar and head portion, said face including a plurality of openings in a pattern in mirror correspondencr to said pattern on said head portion;
   a pair of engaging pins inserted within an operator-selected pair of said openings in said tool member, said pins projecting beyond said tool and being receivable into the corresponding openings of said head portion upon said pattern on said head being aligned with the pattern on said tool member; and
   all of said openings on said head except for the pair alignable with the said selected pair carrying said pins on said tool, being closed with a filler material, whereby a tool member having a said pattern of openings but carrying a pair of engaging pins inserted at other than said operator-selected pair of openings, may not be engaged with said head portion.

10. In the method for securing electronic equipment or the like to a mounting means at a vehicle or other location, said equipment being of the type including at least one threaded opening for normally receiving a securing bolt by passage of said bolt through said mounting means, and into said equipment opening; the improvement enabling ready securing of said equipment while discouraging unauthorized removal thereof, comprising the steps of:

provoding a stud assembly including a threaded shank portion for passing through said mounting means and being threadingly receivable at the opposed end of said shank portion, said head portion having a plurality of openings for receiving engaging pins therein from a cooperating tool, the spatial pattern of said openings defining a plurality of different spacings between pairs of said openings; and an annular collar surrounding said head portion, said collar being freely rotatable about said portion and projecting in a direction opposite said threaded shank to at least the end of said head portion, to thereby prevent grasping of said head portion by a tool;

providing a tool member having a face opposable to said collar and head portions, said face including a plurality of openings in a pattern in mirror correspondence to said pattern on said head portion;

preselecting a pair of said openings in said pattern on said head portion;

securing a pair of engaging pins in the openings on said tool member corresponding to the said selected pair on said head portion, whereby by overlying said pattern on said tool member with the corresponding pattern on said head portion, said pair of pins are engageable with said selected pair of openings in said head to permit application of torque to tighten saud stud assembly; and thereupon filling said openings in said head portion pattern with a hardenable material to effectively close said openings against further engagement.

11. A locking fastener assembly for securing electronic equipment or the like to a mounting bracket or the like, comprising in combination:

a stud assembly comprising a threaded shank portion for passing through an opening in said mounting bracket and being threadingly receivable in an opening at said equipment, and an enlarged head portion at one end of said shank portion having a plurality of openings for receiving engaging pins therein from a cooperating tool, the spatial pattern of said openings defining a plurality of different spacings between selected pairs of said openings;

an annular collar surrounding said head portion and projecting in a direction opposite said threaded shank to at least cover the rim of said head portion, said collar being freely rotatable about and unlockable with respect to said head portion to prevent grasping of said head portion by a tool or interlocking of said head portion with said collar;

a tool member having a face opposable to said collar and head portions, said face including a plurality of openings in a pattern mirroring said pattern on said head portion; and at least a pair of engaging pins being provided within a pair of said openings in said tool member, whereby by overlying said pattern on said tool member with said mirroring pattern on said head portion, said pair of pins may engage with corresponding openings in said head to permit application of torque to tighten and loosen said stud assembly.

* * * * *